(12) United States Patent
Wang et al.

(10) Patent No.: US 7,458,903 B2
(45) Date of Patent: Dec. 2, 2008

(54) HAND GRIP AND METHOD OF MAKING SAME

(75) Inventors: Min Chia Wang, Tainan (TW); Ling Yu Hsu, Yongkang (TW); Ching Chi Chen, Tainan (TW)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/449,108

(22) Filed: Jun. 8, 2006

(65) Prior Publication Data

US 2007/0287551 A1    Dec. 13, 2007

(51) Int. Cl.
*A63B 53/14* (2006.01)

(52) U.S. Cl. ........................................ 473/300

(58) Field of Classification Search ......... 473/300–303, 473/549–552, 201, 568, 203–204; D21/756; D8/DIG. 6–DIG. 8; 74/551.9; 280/821; 16/421, 430, DIG. 12, DIG. 18, DIG. 19
See application file for complete search history.

(56) References Cited

U.S. PATENT DOCUMENTS

| 1,831,255 | A |   | 11/1931 | Menzies |         |
|-----------|---|---|---------|---------|---------|
| D160,396  | S | * | 10/1950 | Karns   | D21/756 |
| D164,241  | S | * | 8/1951  | Karns   | D21/756 |
| 2,992,828 | A |   | 7/1961  | Stewart | 273/80  |
| 4,674,746 | A |   | 6/1987  | Benoit  | 273/81  |
| 5,322,290 | A | * | 6/1994  | Minami  | 473/201 |
| 5,330,193 | A |   | 7/1994  | Ijiri   | 273/193 |
| 5,362,046 | A |   | 11/1994 | Sims    | 273/73  |
| 5,423,536 | A | * | 6/1995  | Brown   | 473/300 |
| 5,465,967 | A |   | 11/1995 | Boeckenhaupt | 273/162 |
| 5,540,625 | A |   | 7/1996  | Koch et al. | 473/318 |
| 5,735,752 | A |   | 4/1998  | Antonious | 473/317 |
| 5,851,632 | A |   | 12/1998 | Chen et al. | 428/156 |
| 6,354,958 | B1 |  | 3/2002  | Meyer | 473/297 |
| 6,506,128 | B1 |  | 1/2003  | Bloom, Jr. | 473/292 |
| 6,656,054 | B2 |  | 12/2003 | Ulrich | 473/201 |
| 6,843,732 | B1 |  | 1/2005  | Huang | 473/300 |
| 6,857,971 | B2 |  | 2/2005  | Huang | 473/300 |
| D502,750  | S |   | 3/2005  | Chen | D21/756 |
| 6,872,157 | B2 | * | 3/2005 | Falone et al. | 473/568 |
| 6,908,400 | B2 |  | 6/2005  | Chu et al. | 473/303 |
| RE38,983  | E |   | 2/2006  | Antonious | 473/317 |

(Continued)

FOREIGN PATENT DOCUMENTS

| CN | 1332022 A | * | 1/2002 |
| GB | 2 315 418 A |  | 4/1998 |
| WO | WO 03-066173 A1 |  | 8/2003 |

OTHER PUBLICATIONS

U.S. Appl. No. 11/619,744, filed Jan. 4, 2007.
U.S. Appl. No. 11/619,739, filed Jan. 4, 2007.
U.S. Appl. No. 11/607,707, filed Dec. 1, 2006.

*Primary Examiner*—Stephen L. Blau
(74) *Attorney, Agent, or Firm*—Daniel S. Kalka (57) ABSTRACT

The present disclosure relates to a multicompound hand grip for an implement, like a golf club grip, that has varying hardness in selected areas. The grip has an inner sleeve and an outer panel. The inner sleeve is made of a first elastomeric material and includes selected raised portions that provide a reinforcement ridge in some embodiments to provide varying hardness at selected locations or areas. The sleeve is made of a material having a durometer value that differs from the material and the durometer value of the outer panel to provide a grip with good tactile feel and gripping qualities.

10 Claims, 8 Drawing Sheets

U.S. PATENT DOCUMENTS

| | | |
|---|---|---|
| 7,008,582 B2 | 3/2006 | Chen .......................... 264/132 |
| 7,048,644 B2 | 5/2006 | Wang .......................... 473/300 |
| 7,097,797 B2 | 8/2006 | Chen .......................... 264/132 |
| D530,762 S | 10/2006 | Chen .......................... D21/756 |
| D536,048 S | 1/2007 | Chen .......................... D21/756 |
| 7,160,202 B2 | 1/2007 | Chen .......................... 473/300 |
| D538,869 S | 3/2007 | Wang et al. ................ D21/756 |
| 7,186,189 B2 | 3/2007 | Huang ........................ 473/300 |
| 7,232,378 B2 * | 6/2007 | Jaw ............................ 473/300 |
| 7,264,759 B2 | 9/2007 | Lamkin ...................... 264/248 |
| 2002/0173371 A1 * | 11/2002 | Lamkin et al. .............. 473/300 |
| 2003/0062654 A1 * | 4/2003 | Lamkin ...................... 264/250 |
| 2003/0157990 A1 | 8/2003 | Bloom, Jr. .................. 473/292 |
| 2003/0216192 A1 | 11/2003 | Chu ............................ 473/300 |
| 2004/0029646 A1 | 2/2004 | Chu et al. ................... 473/300 |
| 2007/0032309 A1 * | 2/2007 | Chang ........................ 473/300 |

* cited by examiner

HAND GRIP AND METHOD OF MAKING SAME

FIELD

The present disclosure relates generally to grips and, more particularly, to hand grips for sporting implements.

BACKGROUND

There are many different types of grips used today for a wide variety of items, including without limitation, golf clubs, tools (hammer handles, screwdrivers, etc.), racquets (racquet ball, squash, badminton, or tennis racquets), bats (baseball or softball), pool cues, umbrellas, fishing rods, etc. While particular reference for this disclosure is being made to the application of golf club grips, it should be immediately apparent that the present disclosure is applicable to other grips as well.

Slip-on golf club grips made of a molded rubber material or synthetic polymeric materials are well known and widely used in the golf industry. The term "slip-on" as employed herein refers to a grip that slides on to a shaft or handle and is secured by way of an adhesive, tape, or the like. Slip-on grips are available in many designs, shapes, and forms.

Golf club grips historically have been made of a wide variety of materials such as leather wrapped directly on the handle or leather wrapped on sleeves or underlistings that are slipped on to the handle, or more recently rubber, polyurethane or other synthetic materials are used. Efforts are constantly being made to improve the gripping quality of the grip without sacrificing the torsional resistance of the grip on the handle or club. Currently, there is great interest in the so-called dual durometer grips which are grips that apply two layers of different materials with varying hardness to provide a grip that has good grip feel and still provides good swing performance.

Thus, there still exists a need for a hand grip that includes a relatively soft outer layer with frictional gripping qualities and tactile feel for a comfortable gripping surface and control, yet has a firm inner layer to minimize torque and maximize responsiveness when swinging a club or handle.

BRIEF SUMMARY OF THE DISCLOSURE

The present disclosure relates to a hand grip having a varying hardness in selected locations which comprises an elongated flexible sleeve constructed to slip onto a shaft. The flexible sleeve is injection molded and formed from at least a first elastomeric material and has a predetermined shape with raised portions in selected areas that defines a lower surface portion of the sleeve. An elongated flexible panel of at least a second elastomeric material and a shape constructed to fit within the lower surface portion and wrap around the lower surface portion of the sleeve is compression molded to the sleeve and is integrally bonded thereto for forming the grip.

The various features of novelty which characterize the present disclosure are pointed out with particularity in the claims annexed to and forming a part of this disclosure. For a better understanding of the instant disclosure, its operating advantages, and specific objects attained by its uses, reference is made to the accompanying drawings, and descriptive matter in which preferred embodiments are illustrated.

DETAILED DESCRIPTION

The present disclosure is described more fully hereinafter with reference to the accompanying drawings, and preferred embodiments are shown and described. The disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Like numbers refer to like elements throughout. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties. The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present disclosure. The sequence of operations (or steps) is not limited to the order presented in the claims or figures unless specifically indicated otherwise.

Even though embodiments of the present disclosure are particularly suited for use as golf club grips and reference is made specifically thereto, it should be immediately apparent that embodiments of the present disclosure are applicable to any device/apparatus that uses a hand grip or sport grip as mentioned previously herein.

Figure 1:
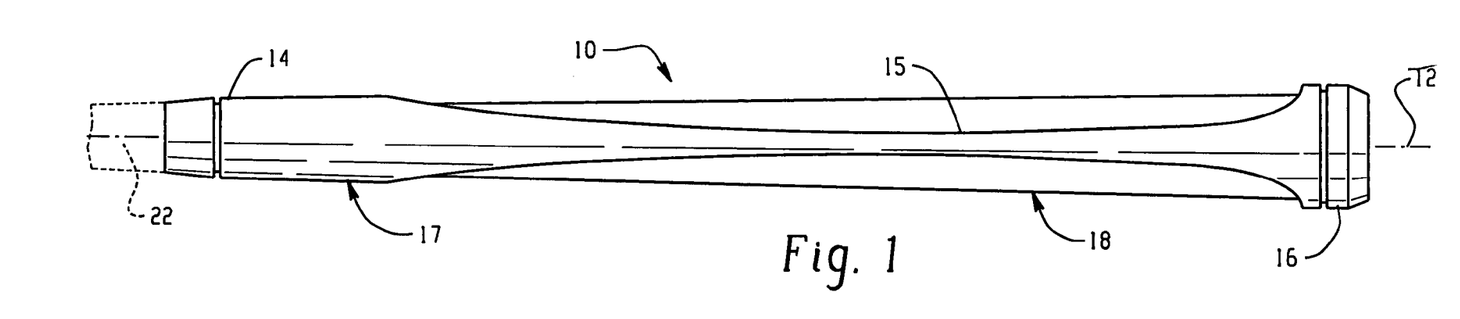
FIG. 1 is a perspective view of a flexible sleeve for a golf club grip, according to some embodiments of the present disclosure.
Figure 2:
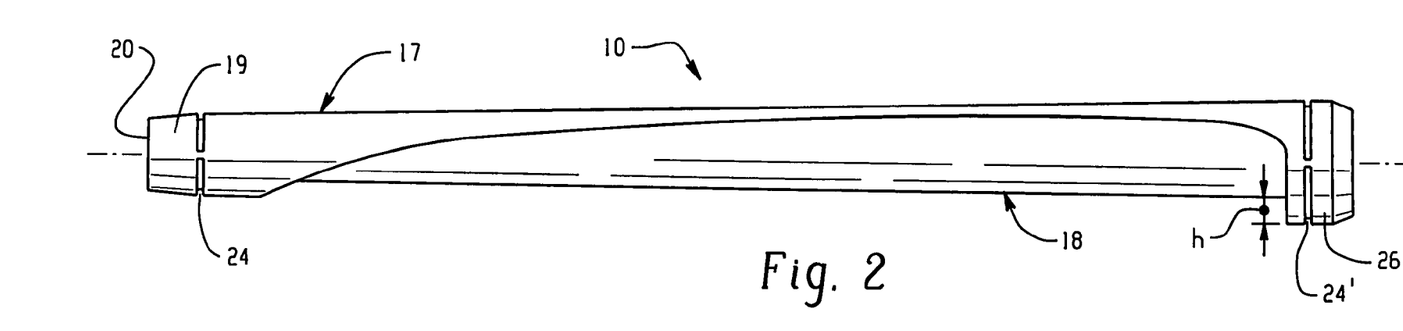
FIG. 2 is a side elevational view of the flexible sleeve of FIG. 1.
Figure 3:
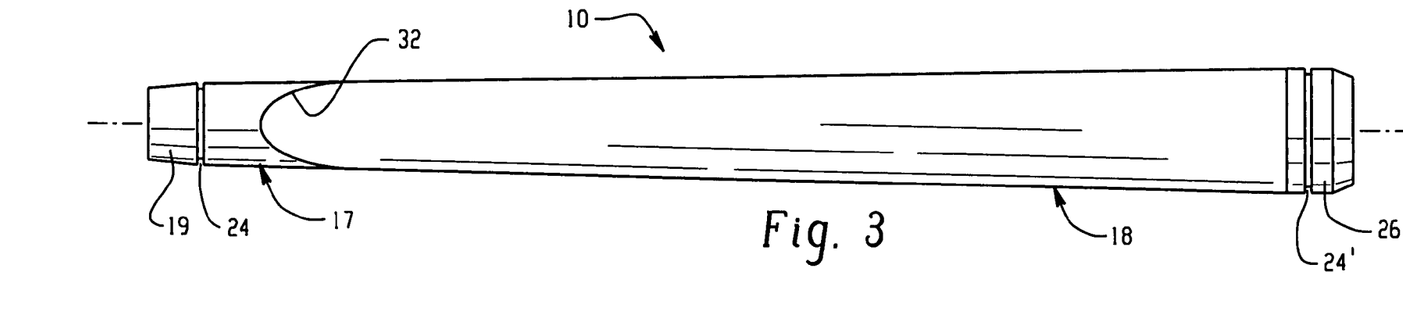
FIG. 3 is a rear view of the sleeve of FIG. 1.

Referring initially to FIGS. 1-3, there is shown an elongated flexible sleeve or underlisting 10 employed as a base member for forming the completed golf club grip depicted in FIGS. 6-9, and FIGS. 12-17. Sleeve 10 is configured to slip onto and be secured to a golf club shaft, according to embodiments of the present disclosure. The sleeve 10 has an internal passageway 12 configured to receive a golf club shaft and has a tapered configuration wherein a lower end 14 (proximal end) has a circumference that is smaller than a circumference of the upper end 16 (distal end). However, golf club grips according to some embodiments of the present disclosure may be designed for virtually any type of golf club, namely both putters and so-called "swing grips", as are shown in FIGS. 6-9 and FIGS. 12-17, for irons and woods. As such, sleeves according to embodiments of the present disclosure may have various shapes and configurations depending on the type of golf club on which the sleeve is to be attached.

The illustrated sleeve 10 is formed preferably by injection molding from an elastomeric material such as, for example, silicone, natural rubber, synthetic rubber, polyurethane, or like polymeric material. The sleeve 10 comprises a material with a first selected hardness. As is known to those skilled in the art, a durometer value or rating is an international standard for the hardness measurement of rubber, plastic and other non-metallic materials. Durometers are described in the American Society for Testing and Material specification ASTM D2240. Sleeve 10 is preferably formed of natural or synthetic rubber to a hardness value ranging from approximately 50 to approximately 60 Shore A hardness by injection molding.

Returning to FIGS. 1-3, sleeve 10 includes a proximal end 14 and an opposite distal end 16 connected to each other by a ridge 15 as best seen in FIG. 1. Ridge 15 serves several different purposes besides being ornamental, including but not limited to providing a zone or area of varying hardness for gripping, strengthening the sleeve 10, and also functioning as a guide for proper hand alignment. Additionally, The proximal end 14, distal end 16, and ridge 15 together define a raised surface portion 17 of sleeve 10 that is elevated or raised by a selected height h from a lower surface portion 18 that may extend either completely around or partially around the sleeve 10 in a desired arrangement or pattern at selected locations or areas as seen in the several views. A nipple portion 19 of proximal end 14 includes an aperture 20 for passageway 12 that receives a golf club shaft 22 shown in dashed lines in FIG. 1. The nipple portion 19 has a tapered outer peripheral wall portion that may include an optional decorative hemispherical lower groove 24 disposed in the body of the nipple 19. Optional lower groove 24 comprises two hemispherical portions on the front and back of the sleeve 10 as best seen in FIGS. 1-3 and is primarily decorative in nature.

A cap portion 26 is located at the distal end 16. Cap 26 is further defined by an optional decorative hemispherical groove portion 24' similar to groove 24. Cap portion 26 and nipple portion 19 are preferably integrally formed in sleeve 10. However, other embodiments can include a cap or nipple being added to sleeve 10 as separate pieces as is known in this art. Embodiments of the present disclosure, however, are not limited to the illustrated sleeve 10.

Figure 4:
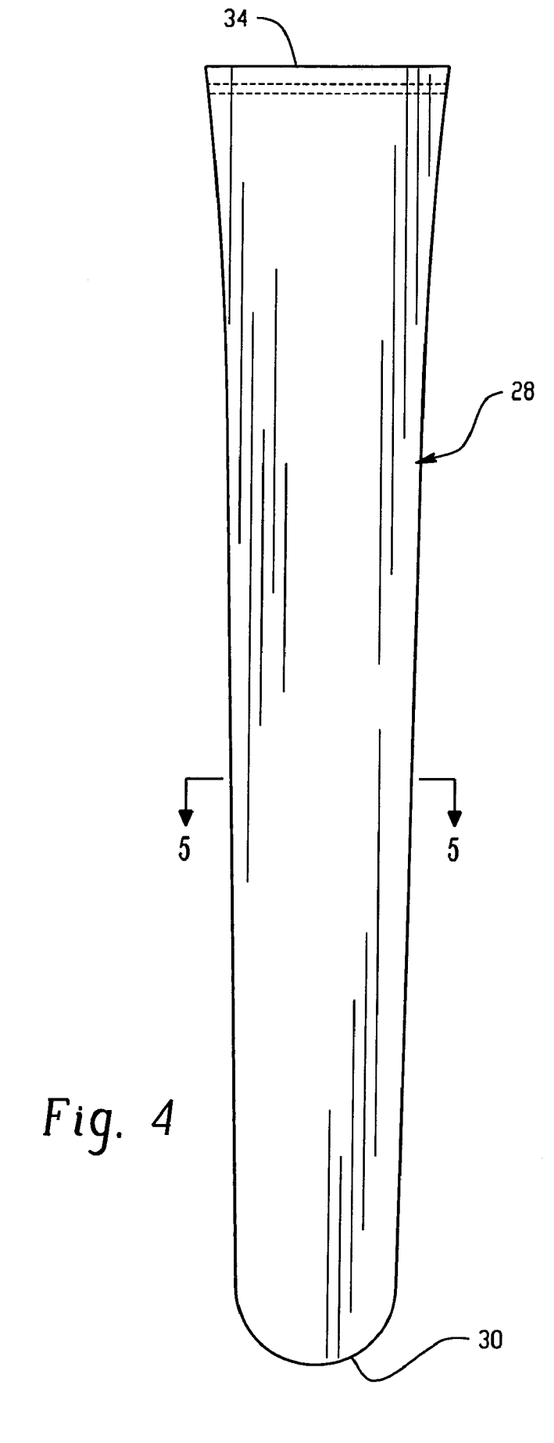
FIG. 4 is a plan view of a flexible panel that is configured to be wrapped around and adhered to the flexible sleeve.
Figure 5:
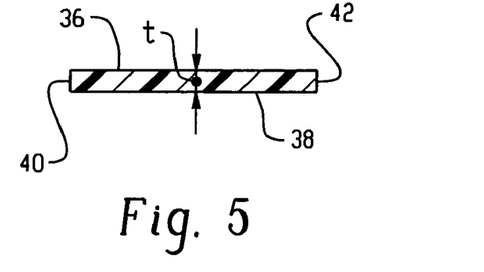
FIG. 5 is a sectional view of the flexible panel of FIG. 4 taken along lines 5-5.
Figure 6:
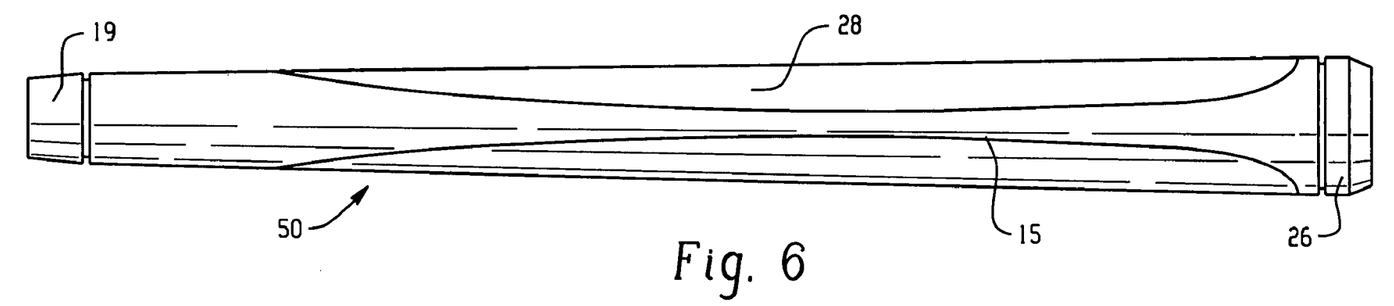
FIG. 6 is a perspective view of an embodiment of a golf grip made in accordance with the disclosed method.
Figure 7:
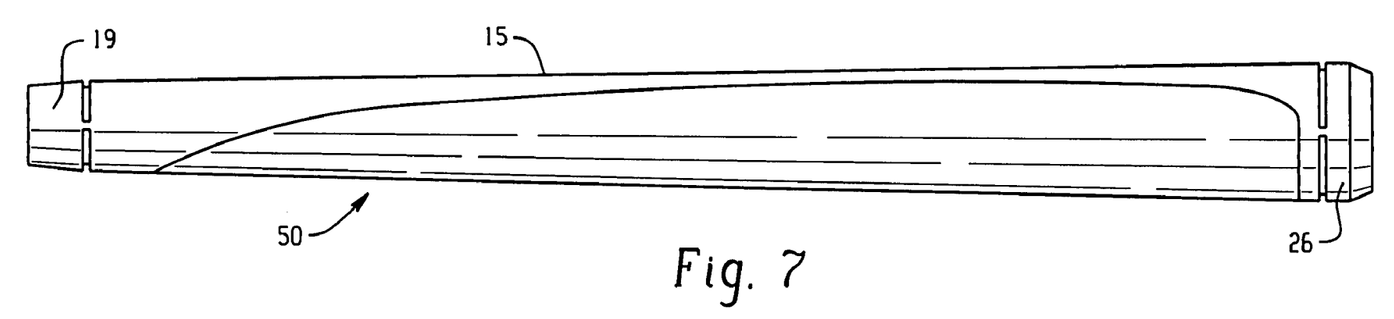
FIG. 7 is a side elevational view of the golf grip shown in FIG. 6.
Figure 8:
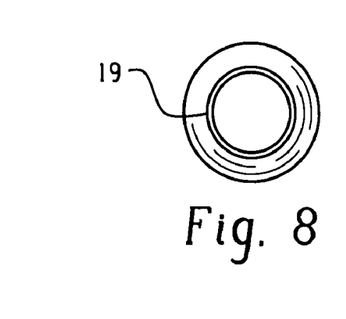
FIG. 8 is a bottom view of the golf grip shown in FIG. 6.
Figure 9:
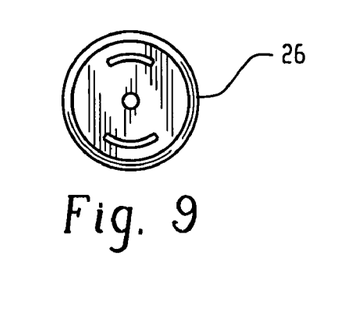
FIG. 9 is a top view of the golf grip shown in FIG. 6.

Referring next to FIG. 4, there is shown a flexible panel 28 made of a flexible elastomeric material, such as, for example, silicone, natural rubber, synthetic rubber, polyurethane, or like polymeric material. Panel 28 has generally a rectangular shape with a lower end 30 in the shape of an arc, and is constructed to be wrapped around and compression molded on sleeve 10 in an arrangement that positions it on where it substantially covers the lower surface portion 18 of sleeve 10. The thickness t of panel 28 is defined relative to the dimension h taking into consideration and compensating for any changes in the dimensional thickness due to the compression molding process. The lower or proximal end 30 of panel 28 is preferably in the shape of an arc and is constructed to be received within the cup portion 32 in the proximal end 14 of sleeve 10. The panel 28 is a material, or may even be several different materials, in a combined or layered manner, that preferably has a different durometer value or an arrangement of varying hardness from that of sleeve 10. The durometer value of panel 28 preferably ranges from approximately 30 to approximately 45 Shore A for providing a grip feel with good frictional qualities and a tactile feel. It should be immediately apparent that other embodiments of the panel 28 of the instant disclosure will take the same shape as the desired pattern of the lower surface of the sleeve in other embodiments as seen in FIGS. 12-17. The shape of panel 28 depends upon the shape of the selected pattern or locations of the lower surface portion 18 of the sleeve 10 and the desired shape and width of the ridge 15 in the sleeve 10. As is apparent from FIGS. 12-17, the sleeve 10 and ridge 15 may have different selected shapes or forms which will influence the shape and width of panel 28 to conform with the lower surface portion 18 of the sleeve 10 in the desired or selected areas or locations to provide a grip with varying hardness in selected locations, and desired feel in those locations. The panel 28 can have different selected durometer values depending upon desired gripping characteristics and patterns.

According to some embodiments of the present disclosure, printed indicia, ornamental features and styling, and grip design enhancements such as grooves, channels and/or indentations as described in greater detail with respect to FIGS. 12-17 may be applied on or into the surface of the panel 28 even when it is still in a flat condition prior to being compression molded on the sleeve 10.

Referring again to FIG. 4, the elongated flexible panel 28 is configured to be wrapped around sleeve 10 and integrally bonded thereto by way of compression molding the panel 28 onto the lower surface portion 18 of the sleeve 10 to form the completed golf club grip. The illustrated panel 28 includes opposite proximal and distal end portions 30, 34, opposite first or top surface 36 and second or bottom surface 38, and opposite first and second edge portions 40,42. The distal end 34 has a width greater than that of the proximal end 40 and the first and second edge portions 40,42 taper outwardly beginning from the proximal end 30 going towards the distal end 34, as shown, in order to conform with the shape of the sleeve 10 for the embodiment shown in FIGS. 6-9. The illustrated panel 28 has a configuration such that, when wrapped around sleeve 10, the opposite first and second edge portions 40,42 will touch the ridge 15 on opposite sides. Ridge 15 may be used to assist in hand alignment or hand placement on the completed grip. Also, the grip feel will be selectively distinct for those fingers placed on the ridge 15 and those placed on panel 28 since these two materials have different durometer or hardness values.

Flexible panels according to embodiments of the present disclosure can have any shape and configuration necessary depending upon the shape and configuration of a sleeve around which they are to be wrapped and bonded thereto by compression molding as later described herein, or bonded to the sleeve by alternate means including without limitation adhesive bonding. Embodiments of the present disclosure, however, are not limited to the illustrated shape and configuration of panel 28.

According to some embodiments of the present disclosure, exposed panel surface 36 may be smooth or may contain patterns and/or impressions formed therein as mentioned previously. It is recognized that the flexible sleeve 10 may separately include patterns/impressions formed therein or thereon as well. According to some embodiments of the present disclosure, panel 28 may be clear or may have one or more colors and/or graphics/patterns thereon.

Referring to FIGS. 6-9, a golf club grip 50 formed by bonding the panel 28 of FIG. 4 to the sleeve 10 of FIGS. 1-3 is shown in the several views. Grip 50 is aesthetically pleasing and may include any of a wide variety of designs, indicia or impressions on the grip 50.

Figure 10:
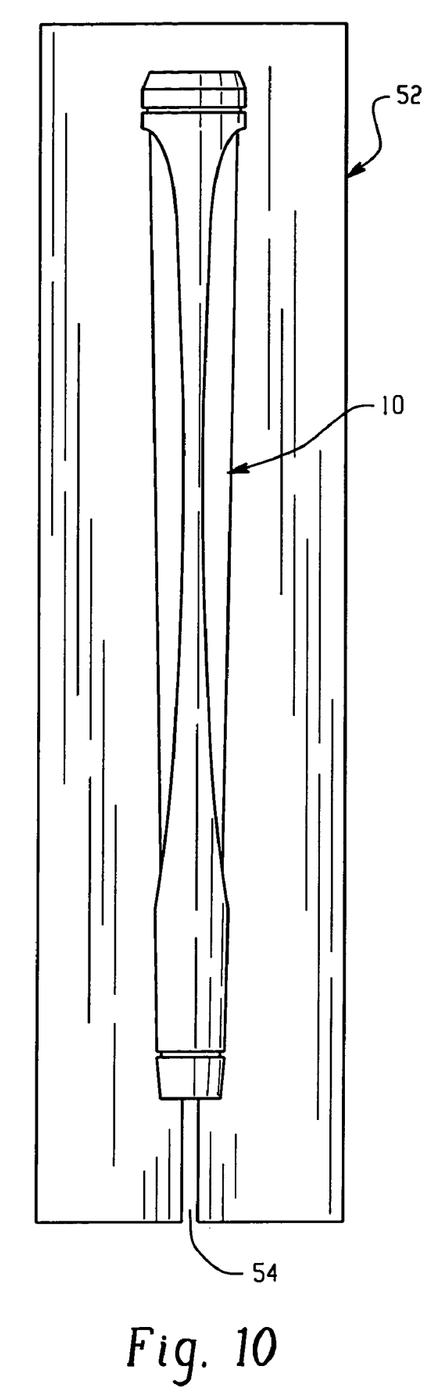
FIG. 10 depicts the injection molded sleeve situated in a portion of the injection molding die.

The method for forming golf grip 50 begins with making the sleeve or underlisting 10 by injection molding the sleeve 10 in a die 52. FIG. 10 shows a completed sleeve 10 in one half of a schematically illustrated die 52. The structure and operation of injection molding dies are well known in this art. The cavity of the die 52 is hollowed out in the desired shape of the sleeve 10 and the first elastomeric material, which is preferably a rubber material, is injected in a liquid state into the cavity of die 52 through a passage 54. Injection molding of rubber grips is well known in this art and requires no further explanation here, for example, suitable methodology is described in detail in U.S. Pat. No. 5,261,665.

Figure 11:
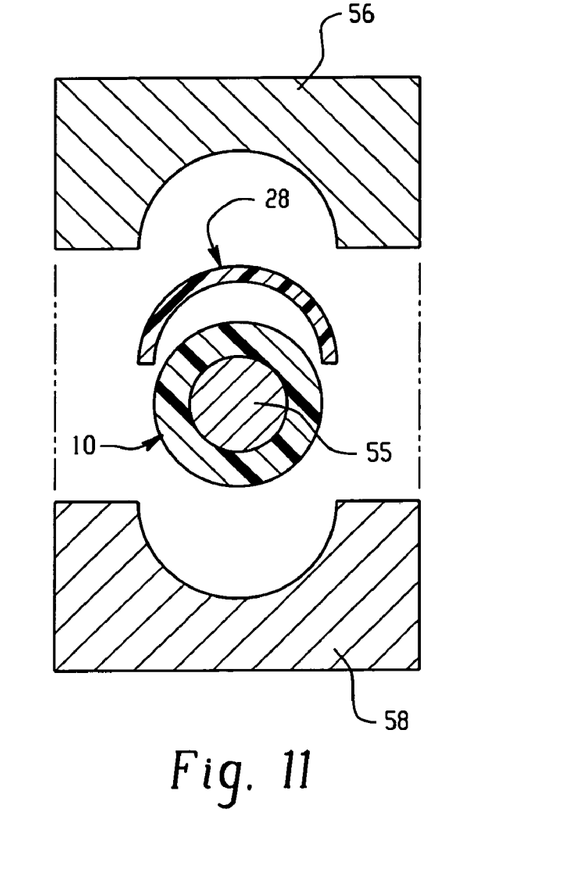
FIG. 11 is a sectional view of the sleeve on a mandrel being placed within an upper and a lower half of a compression mold with a flexible panel.

Turning next to FIG. 11, after the injection molding step, the formed sleeve 10 is placed on a mandrel 54 with panel 28 positioned over the lower surface portion 18 of the sleeve 10 within the two halves 56, 58 of a compression mold. The two halves 56, 58 of compression mold are brought together with pressure and heat as is well known in this art to bond and/or fuse panel 28 to sleeve 10 for forming the grip 50. The heat provided by the compression mold and the compressing force is sufficient to form the material of panel 28 and the sleeve 10 into an integrated grip 50. If the material is rubber, the heat is sufficient to vulcanize the rubber of the panel 28 to the sleeve 10.

Figure 12:
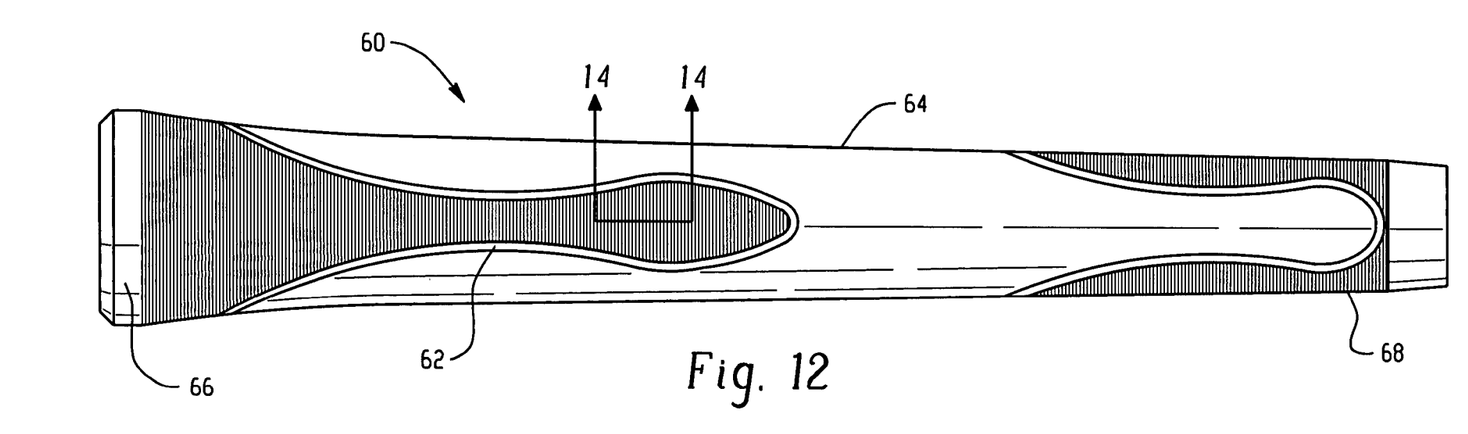
FIG. 12 is a perspective view of another embodiment of a golf grip made in accordance with the disclosed method.
Figure 13:
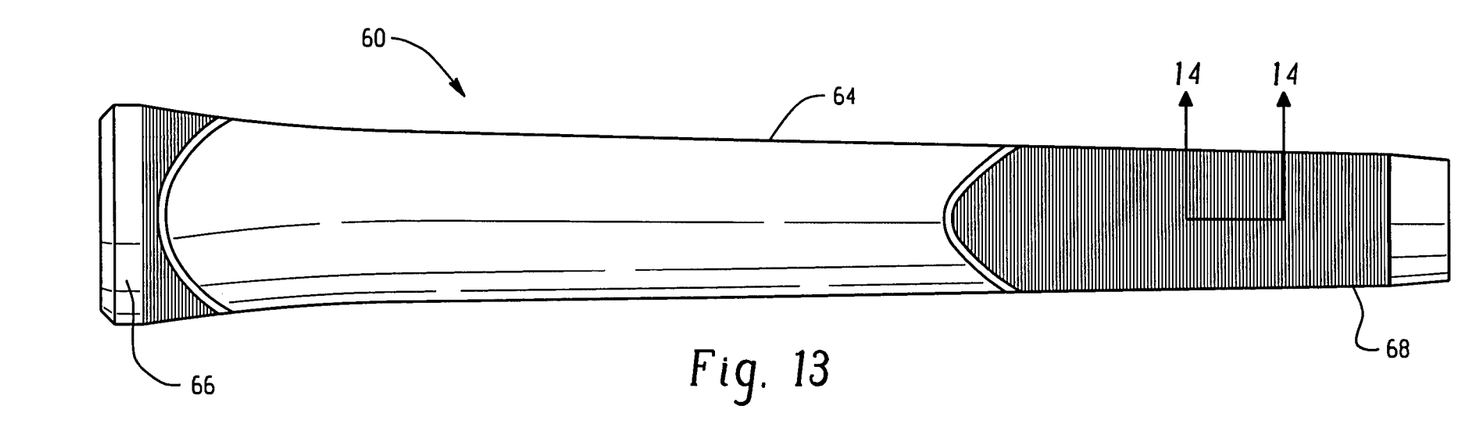
FIG. 13 is a rear view of the embodiment shown in FIG. 12.
Figure 14:
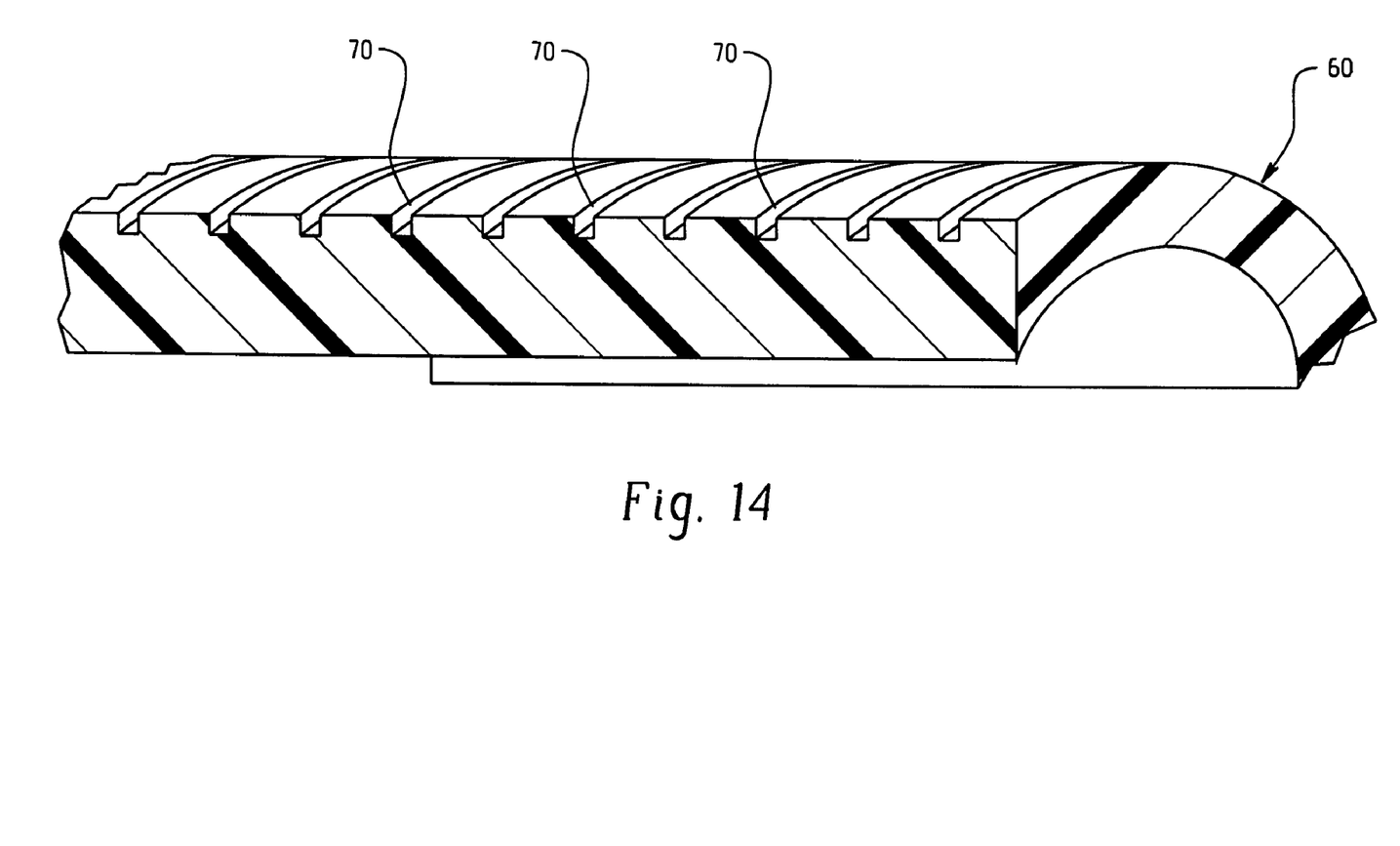
FIG. 14 is a partial sectional view of the embodiment shown in FIGS. 12 and 13 taken along lines 14-14.

The method of the present disclosure can be used to form grips of various designs and shapes. FIGS. 12-14 show another embodiment of a grip 60 according to the present disclosure. In this embodiment, the ridge 62 only extends partially along the length of the grip 60 as illustrated, and provides a varying hardness in that selected location. The ridge 62 in this embodiment or other embodiments as mentioned previously can also serve as a guide for hand alignment or placement on the grip 60 for a consistent swing. The panel 64 which is similar in material to panel 28 is molded to the lower surface portion of the grip 60 as described previously and is shown with a frontal view in FIG. 12, and a rear view shown in FIG. 13. The portion of the grip 60 not covered with panel 64 includes the upper end 66 and the lower end 68 seen in FIGS. 12 and 13. FIG. 14 is a sectional view of a portion of grip 60 depicting channels 70 cut into selected areas and arranged in a set manner as shown for a decorative and ornamental appearance. Channels 70 further may add to the frictional resistance and grip feel of the grip 60.

Figure 15:
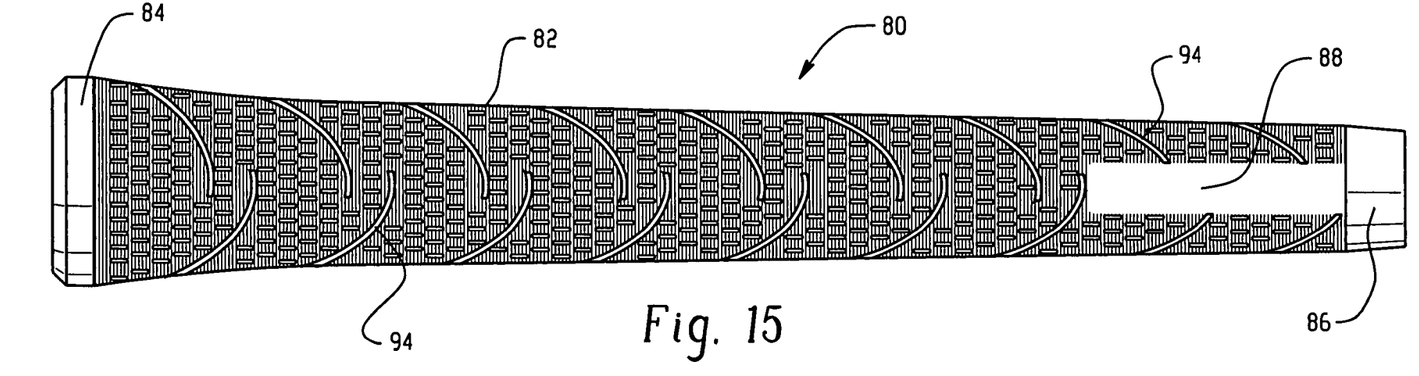
FIG. 15 is a perspective view of still another embodiment of a golf grip made in accordance with the disclosed method.
Figure 16:
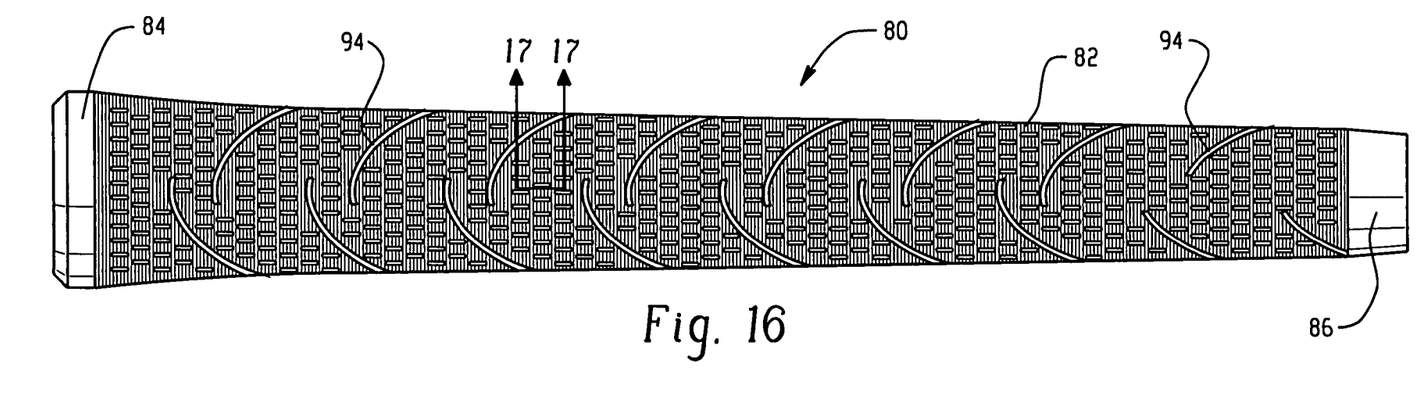
FIG. 16 is a rear view of the embodiment shown in FIG. 15.
Figure 17:
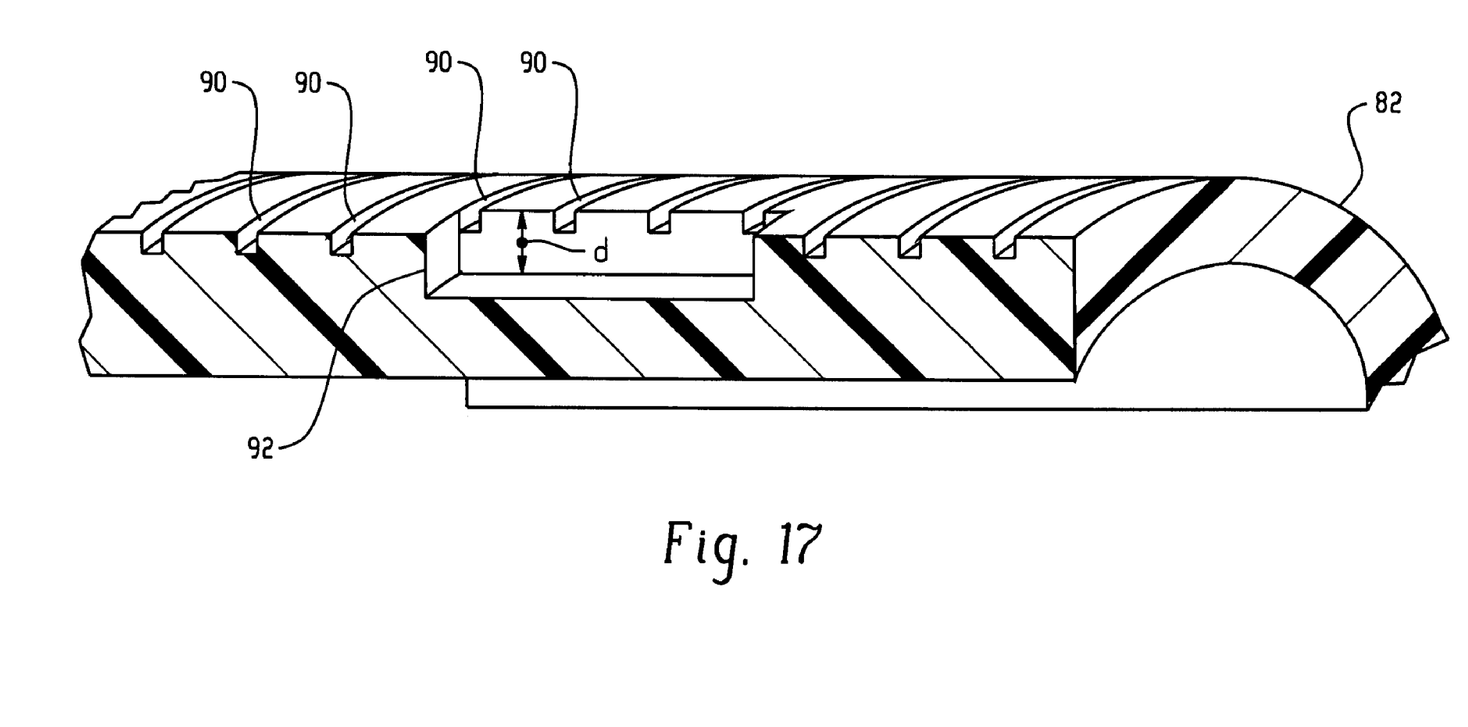
FIG. 17 is a partial sectional view of the embodiment shown in FIG. 15 taken along lines 17-17.

Referring next to FIGS. 15-17, there is shown still another embodiment of a golf club grip 80 according to the present disclosure. Grip 80 unlike the other embodiments herein does not include a ridge portion, but may include an elevated area 88 for marking a brand or other indicia. A panel 82, similar in structure and material to panel 28, wraps around a selected lower surface portion of the sleeve. The selected surface for grip 80 extends from the cap 84 at the upper end of the grip to the nipple 86 at the lower end of the grip 80. Panel 82 optionally includes a surface area 88 for printed indicia, like a trade name or trademark, and may be elevated if desired. Panel 82 also can include an ornamental and decorative design as seen in FIGS. 15-17. The decorative design seen in FIGS. 15-17 can also serve to provide a tactile grip feel with good gripping characteristics like grip feel, and frictional gripping qualities. The selective arrangement of the design shown in FIG. 15-17 includes channels 90, indentations 92, and grooves 94 positioned in an organized structure in the grip 80. This design allows an individual to firmly grasp and hold onto the grip. The channels 90 are preferentially disposed in a fairly circumferential manner on the grip 80 as seen in FIGS. 15-17.

The indentations 92 are spaced axially along the length of the panel 82 and each indentation has a depth d that is greater than a depth of channel 90. The grooves 94 are disposed along the length of the panel 82 in an arrangement where each groove curves in the direction of the opposite side of the grip 80 as seen in FIGS. 15 and 16. The channels 90, indentations 92, and grooves 94 together feature a unique and pleasant design and add to the feel of the grip 80.

The foregoing is illustrative of the present disclosure and is not to be construed as limiting thereof. Although a few exemplary embodiments of this disclosure have been described, those skilled in the art will readily appreciate that many modifications are possible in the exemplary embodiments without materially departing from the novel teachings and advantages of this disclosure. Accordingly, all such modifications are intended to be included within the scope of this disclosure as defined in the claims. The disclosure is defined by the following claims, with equivalents of the claims to be included therein.

We claim:

1. A golf grip for an, comprising:

an elongated flexible sleeve constructed to slip onto a shaft, said entire flexible sleeve being injection molded and formed from at least a first elastomeric material, said flexible sleeve having a cap portion at an upper end, a nipple portion at a lower end, and a ridge extending partially along a length of said flexible sleeve, said cap portion, said nipple portion and said ridge forming raised portions at selected locations and at a selected height h in a desired arrangement on said flexible sleeve and for defining upper and lower surface portions in said flexible sleeve in a desired pattern with arc shapes, said raised portions including a plurality of radially spaced channels for providing frictional resistance, said ridge and arc shape patterns providing zones for selected hardness for gripping and as a guide for hand placement; and an elongated flexible panel of at least a second elastomeric material having a generally rectangular shape being integrally bonded to said elongated flexible sleeve, said elongated flexible panel conforming to said desired pattern of said lower surface portion of said elongated flexible sleeve, said elongated flexible panel having proximal and distal end portions, said distal end portion of said elongated flexible panel having a width greater than said proximal end portion, said elongated flexible panel having a lower end in said proximal end portion in a shape of an arc conforming to the arc in said lower surface portion of said elongated flexible sleeve, said elongated flexible panel being constructed to wrap around said lower surface portion of said flexible sleeve, said flexible panel having a thickness t defined relative to the selected height h in said flexible sleeve and compensating for changes due to compression molding to said flexible sleeve for being integrally bonded to said sleeve for forming a grip with a grip feel having a varying hardness that is selectively distinct for fingers placed on said panel from fingers placed on said ridge for gripping wherein said raised portions of said cap portion and said ridge are directly connected and wherein said panel completely separates said raised portions of said cap portion and said ridge from said raised portion of said nipple portion around an entire circumference of said sleeve.

2. The grip of claim 1, wherein said grip comprises a golf club grip.

3. The grip of claim 2, wherein said flexible panel comprises a material with a durometer value different from a durometer value of said flexible sleeve, and having first and second edge portions that taper outwardly beginning from said proximal end portion and going towards said distal end portion.

4. The grip of claim 3, wherein said flexible panel comprises a durometer value ranging from approximately 30 to approximately 45 Shore A.

5. The grip of claim 4, wherein said flexible sleeve comprises a rubber material with a durometer value ranging from approximately 50 to approximately 65 Shore A.

6. The grip of claim 2, wherein said ridge provides a location for hand placement.

7. The grip of claim 2, further comprising a plurality of at least one member selected from the group consisting of indentations, elevated indicia, channels, and grooves disposed on a surface of said grip.

8. The grip of claim 2, further comprising a plurality of at least one member selected from the group consisting of indentations, elevated indicia, channels, and grooves spaced on said flexible sleeve.

9. The grip of claim 2, further comprising a plurality of at least one member selected from the group consisting of indentations, elevated indicia, channels, and grooves disposed on a surface of said flexible panel.

10. The grip of claim 2, further comprising a decorative pattern of impressions on a surface of said grip.

* * * * *

UNITED STATES PATENT AND TRADEMARK OFFICE
CERTIFICATE OF CORRECTION

PATENT NO. : 7,458,903 B2
APPLICATION NO. : 11/449108
DATED : December 2, 2008
INVENTOR(S) : Wang et al.

It is certified that error appears in the above-identified patent and that said Letters Patent is hereby corrected as shown below:

Column 7, Claim 1, line 1, kindly delete "for an".

Signed and Sealed this

Sixteenth Day of June, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,458,903 B2 |
| APPLICATION NO. | : 11/449108 |
| DATED | : December 2, 2008 |
| INVENTOR(S) | : Wang et al. |

Page 1 of 1

It is certified that error appears in the above-identified patent and that said Letters Patent is hereby corrected as shown below:

Column 7, Claim 1, line 21, kindly delete "for an".

This certificate supersedes the Certificate of Correction issued June 16, 2009.

Signed and Sealed this

Fourteenth Day of July, 2009

JOHN DOLL
*Acting Director of the United States Patent and Trademark Office*